United States Patent [19]
Krumm

[11] Patent Number: 5,419,574
[45] Date of Patent: May 30, 1995

[54] ADJUSTABLE FRAME RECUMBENT BICYCLE

[76] Inventor: Paul J. Krumm, 529 S. Chestnut St., Lindsborg, Kans. 67456

[21] Appl. No.: 280,575

[22] Filed: Jul. 25, 1994

Related U.S. Application Data

[63] Continuation of Ser. No. 63,127, May 14, 1993, abandoned, which is a continuation of Ser. No. 775,276, Oct. 10, 1991, abandoned.

[51] Int. Cl.$^6$ .............................................. B62K 15/00
[52] U.S. Cl. ................................. 280/278; 280/288.1; 280/288.4
[58] Field of Search ...................... 280/278, 287, 288.1, 280/274, 281.1, 288.4; 297/197, 198, DIG. 9

[56] References Cited

U.S. PATENT DOCUMENTS

| | | | |
|---|---|---|---|
| 690,733 | 1/1902 | Jarvis | 280/288.1 X |
| 690,734 | 1/1902 | Jarvis | 280/270 |
| 1,502,975 | 7/1924 | Bailey | 297/198 |
| 2,482,472 | 9/1949 | Fried | 280/288.1 |
| 4,333,664 | 6/1982 | Turner et al. | 280/288.1 X |
| 4,502,705 | 3/1985 | Weaver | 280/288.1 X |
| 4,572,535 | 2/1986 | Stewart et al. | 280/288.1 X |
| 4,618,160 | 10/1986 | McElfresh | 280/288.1 |
| 4,647,060 | 3/1987 | Tomkinson | 280/288.1 |
| 4,786,070 | 11/1988 | Adee | 280/287 X |
| 4,925,203 | 5/1990 | Buckler | 280/288.1 X |
| 5,201,538 | 4/1993 | Mayn | 280/288.1 |

FOREIGN PATENT DOCUMENTS

| | | | |
|---|---|---|---|
| 2106584 | 9/1972 | Germany | 280/278 |
| 3837018 | 5/1990 | Germany | 280/288.1 |
| 1562216 | 5/1990 | U.S.S.R. | 280/288.1 |

OTHER PUBLICATIONS

Description of ATP Bicycle, 1992 Recumbent Bicycle Buyer's Guide.
Description & Ad of Presto.
Ad of Lightning.

Primary Examiner—Karin L. Tyson
Assistant Examiner—Kevin Hurley

[57] ABSTRACT

A recumbent bicycle designed to be flexible in its geometry, adjustable in wheel base, position of seat, position and angle of front fork steering head tube mechanism, lead of front wheel bearing position on front fork, and/or position of foot pedal crank mechanism, allowing ergometric optimization for riding ease, comfort, stability, safety, etc.

The unique aspect of the present invention is that the relationship between the bicycle seat and the rear wheel can be ergonomically optimized, and then the positioning of other elements can be optimized for the individual rider without altering the rear wheel to rider relationship.

19 Claims, 6 Drawing Sheets

ADJUSTABLE FRAME RECUMBENT BICYCLE

This application is a continuation of Ser. No. 08/063,127, filed May 14, 1993, now abandoned, which is a continuation of Ser. No. 07/775,276, filed Oct. 10, 1991, now abandoned.

FIELD OF INVENTION

This invention relates to recumbent bicycles, specifically to such bicycles as are adjustable for different sized riders and different riding conditions.

BACKGROUND—DESCRIPTION OF PRIOR ART

Most bicycles of today are of a sit-up diamond frame design. Numerous attempts have been made to introduce recumbent bicycle designs with limited success despite their potential advantages in comfort and power production. While resistance to change has been one reason, another has been difficulty working around the geometric limitations of the recumbent design itself, to design a bicycle that is practical, stable, safe, maneuverable, and easy to ride. There have been two general classes of solutions in the more common and comfortable feet forward position. One is the long wheel base solution, characterized by Jarvis' U.S. Pat. No. 690,733 of Jan. 7, 1902. The second is the short wheel base solution characterized by Fried, (U.S. Pat. Nos. 2,482,472), Turner et.al (4,333,664), and McElfresh 4,618,160).

Both of these general designs have been built with hand operated steering means (handlebars) below the rider's legs and above the rider's legs. While designs with steering means below the riders legs have come on the market, they have had limited market acceptance. It is the belief of the present inventor that many riders feel safer with handlebars in front of them as at least some perceived protection in the event of a crash.

An additional problem in the mass manufacture of recumbent bicycles has been that more of the basic elements of the bicycle need to be fitted to the individual rider. In diamond frame conventional bikes, the only elements that are adjustable are the seat, and to a limited extent, the handlebars. Otherwise, one frame size fits a fairly wide variety of riders. A child who starts out on a conventional 20 inch wheel bike, can graduate directly to a 26 or 27 inch wheel adult bike of present manufacture. Because of design constraints, a change of 2 or 3 inches in leg length can make a non-adjustable frame recumbent bicycle not fit its rider.

It is especially difficult to fit the short wheel base recumbents to different sized riders, and different riding conditions. The short wheelbase design is potentially much more maneuverable and easier to store than the long wheelbase configuration because of its smaller size. However its design is more complex and constrained. Its major elements (wheels, seat, steering means, and pedal power means) are constrained in their positions in order that they stay out of the way of each other and the rider while providing good rideability. Optimization of the interrelationships between these elements has never been thoroughly researched because of the difficulty in making adjustments between all elements, or each one with respect to all the rest.

In the adjustable frame semi-recumbent design of Buckler, (U.S. Pat. No. 4,925,203), the seat is adjustable with respect to the rest of the frame. However frame construction is such that seat position is taken as a variable, rather than a possible given, around which to adjust the rest of the frame.

In the present invention, the position of the seat can be set so that it just clears the rear wheel as it is moved upwardly and back, or forward and down. Its position with respect to the rear wheel can therefore be optimized according to use, and the rest of the frame adjusted to fit the rider. This makes it possible to minimize the length of the forward extension to the pedal assembly, and the total length of the bicycle, as well as to optimize geometry for rideability. While Buckler has rudimentary means to alter wheelbase and steering axis angle (by replacing parts) he does not provide any independent adjustment in pedal crank assembly position. Adjustments for rider leg length are made in the elements connecting the seat to the main frame member, moving the seat with respect to the rest of the frame. This is the only infinitely variable adjustment on the Buckler machine.

In addition the Buckler bicycle is a semi-recumbent, not a true recumbent, as is the machine described herein. As such it is not designed so that the pressure created by pushing on the pedals is directly transferred to the seat back, as is the case on a true recumbent, such as the present design. With the Buckler machine, pedal pressure is counteracted by gravity and upward tension on the steering handlebars.

The recumbent frames of McElfresh (U.S. Pat. Nos. 4,618,160), Turner et. al. (4,333,664), and Fried (2,482,472), all embody non-adjustable frame structures between the foot operated pedals and the rear wheel. Any adjustments for operator leg length on these designs compromises the position of the rider with respect to the rear wheel, a critical parameter in terms of rideability. Turner et. al. and Fried provide no adjustments other than seat position. McElfresh provides means to adjust the distance between the seat and the front wheel steering axis, but he does not provide for, or teach in his specification, adjustment of the steering axis angle. This angle in fact changes in an uncontrolled manner as the front wheel assembly is moved along the frame in his design. In addition, all of his drawings show the imaginary upward extension of the steering axis to be well ahead of the rider's body and head, a poor choice for another very important design parameter that will be discussed in greater depth later.

The prior art recumbents that most resemble the present invention are unpatented. They include the ATP, the Presto, and the Lightning. These bicycles are provided with what is termed in the industry an adjustable boom, a single telescopic member that corresponds to the front extension of the present invention. While this configuration allows the frame to be adjusted to riders of differing leg length, they suffer from two limitations. First, the single member lacks the stiffness that is inherent in the triangulated structure of the present invention. They are notorious for their flexibility, an ergonometric deficiency, as well as a possible safety hazzard. The patents of Fried and Turner, et.al. are specifically aimed at dealing with this deficiency. Secondly, prior art single adjustable boom bicycles lack the potential for vertical as well as horizontal adjustment of the foot power means.

Suspension systems for recumbent bicycle seats are more complex than those of standard bicycles, because the seat has more than one function. There has been a long tradition of providing a sprung seat on recumbent bicycles. Jarvis' original recumbent bicycle frame patent was accompanied by another (U.S. Pat. No. 690,734) for a sprung seat.

On a standard diamond frame bike, the only function of the seat is to support the weight of the rider. Any spring function is normally carried out with the use of coil springs, however flat springs also have a long tradition (see, for instance Bailey, (U.S. Pat. No. 1,502,975). On a recumbent there are two additional functions. The first is to support the back of the rider, and the second is to counteract the force of pressing on the pedals, which force is counteracted by pressure of the rider's hips against the lower seat back.

Therefore the hips must be supported from behind by means of strength equal to the toggle force produced by the straightening of the operator's legs against the pedals, which can be quite great. This force includes a well known torsional moment, caused by the fact that the pedals and the individual hips of the rider are off the centerline of the frame. This force is discussed by Fried and Turner et.al., tho they do not spring the seats on their designs.

Jarvis' seat springing solution is to have another tube parallel to the seat post, and spaced several inches behind it, reinforced by upper rear wheel stays that connect the top end of this tube to the rear fork wheel brackets. He provides rollers on the seat back that roll up and down this tube, moving with the seat bottom, whose conventional seat stem slides up and down in its conventional seat post. The seat is sprung by a coil spring inside the seat post.

McElfresh takes a different tack, designing a seat in the form of a hammock. While giving resilience, this seat forces a transfer of much of the force against the pedals to the upper back of the rider, needlessly tiring the back and torso muscles. Others such as Weaver et al have used webbed seats; however a well sprung, comfortable seat has not been designed heretofore.

OBJECTS AND ADVANTAGES OF THE PRESENT INVENTION

It has been the object of my invention to provide a recumbent bicycle with means to easily make adjustments to and between all of its major elements, listed above for ergonometric optimization. Important considerations include: The size of wheels, both front and rear; the relative of the seat with respect to the rear wheel; the relative position of the front wheel and steering means to the rear wheel and seat; the relative position of the pedals and drive chain or other drive means to the rear wheel, seat and other elements; and finally but most importantly, the relative position and angle of the seat and rider to the wheels, pedals and both position and angle of the steering axis. It is only after testing hypotheses about stability and rideability with a completely adjustable design, that frame geometry for recumbent bicycle design could be optimized.

DESIGN CONSIDERATIONS OF THE PRESENT INVENTION

Experimentation with the adjustable frame recumbent bicycle has shown that the relationship between the rear wheel and the rider (both position and angle of the seat) is important and should be set, as a first step in design, according to the use anticipated and the size of the anticipated rider. For around town street use, a fairly erect, more rearward and higher seat position is appropriate. Where longer distance touring, or higher speed use is anticipated, a lower more reclined position with the addition of a possible head rest is appropriate. The higher, more erect rearward position makes mount and dismount easier, increases visibility, and makes the necessary front extension for the pedal assembly shorter. The lower, more reclined position lowers frontal area, and wind resistance.

The size of front wheel chosen constrains the height of the pedal crank assembly, as clearance must be provided so that the rider's feet and legs do not impinge on the front wheel during turns. If a larger e.g. 20 inch or larger front wheel is chosen, the pedals will be elevated further off the ground. If a smaller e.g. 16 inch or smaller front wheel is chosen, steering will be lighter and more sensitive, but pedal position will be lowered for easier mount and dismount.

As the seat and rider are moved forward with respect to the rear wheel, more weight is placed on the front wheel. This makes a larger front wheel appropriate for its decreased rolling resistance, and better handling on rough surfaces under higher loadings. In present practice, a 16 or 20 inch front wheel has been used. Either standard 26 or 27 inch or 700 mm rear wheels are appropriate for bikes intended for adult use. Children's bikes would of course be proportionally smaller.

Other design considerations are as follows. The angle and position of the head tube steering axis means with respect to the seat and rider has been found to be critical to ride-ability. Specifically, as an imaginary line extended up thru the head tube, or steering axis approaches the rider's mass, or at least the rider's head, the rider senses a feeling of stability, as if he is a part of the machine instead of a separate entity atop an unwieldy thing. Therefore, as the front wheel is extended forward, the steering axis must be inclined more to keep its imaginary upper extension aimed back toward the rider. The optimum position of the front wheel is far enough away from the rear wheel to provide a wheel base long enough so that steering is not too fast, but not so far forward so that excessive inclination in the steering axis is necessary to bring its imaginary extension line back toward the rider's center of mass, or at least the rider's head.

Secondary to this setting, the lead of the front wheel axle in front of the imaginary downward extension of said head tube steering axis means to the ground is another function that must be properly set. As the steering axis inclination is increased, the lead of the front wheel axis in front of the steering axis must be increased to maintain good steering characteristics. In practice it has been found that if the imaginary line extending down from the steering axis is roughly at or a little bit behind an imaginary vertical line extending down from the front wheel axis, optimum stability and rideability are achieved.

The position of the pedal assembly has two major constraints. The first, as mentioned earlier, is that the rider's feet and legs must clear the front wheel even as said front wheel turns on its steering axis. In long wheelbase designs, this means that the front wheel must be far enough forward to clear the pedals and the rider's feet. As the wheel base is shortened, the pedal assembly must be moved upwardly for foot clearance over the front wheel. As the pedals are extended past the front wheel, they can again be lowered somewhat, provided the second constraint, the line of the drive chain or other drive means is taken into consideration. As an example, Turner et al, U.S. Pat. No. 4,333,664, use idler wheels near the steering axis to deal with this constraint.

The chain or other drive means also acts as a constraint on how far the rider's seat can be lowered. Here again there is a balance, now between rear wheel size and rolling resistance. Attempts to lower the rider's position to lower wind resistance by providing a smaller rear wheel are met with the increased rolling resistance of the smaller rear wheel. It is for this reason that present practice is to use larger rear wheels. This could change if smaller wheels with low rolling resistance and good ride characteristics could be provided.

DETAILED DESCRIPTION OF THE PRESENT INVENTION

The crux of the present invention is the use, in new and novel ways, of the type of slip joint used to adjust the height of the seat in present art diamond frame bicycles. The frame of the present invention consists of structural means which combine such slideable joints with transversely rotateable joints at their ends, which frame is adjustable in infinitely small increments in all salient ways.

Figure 1:
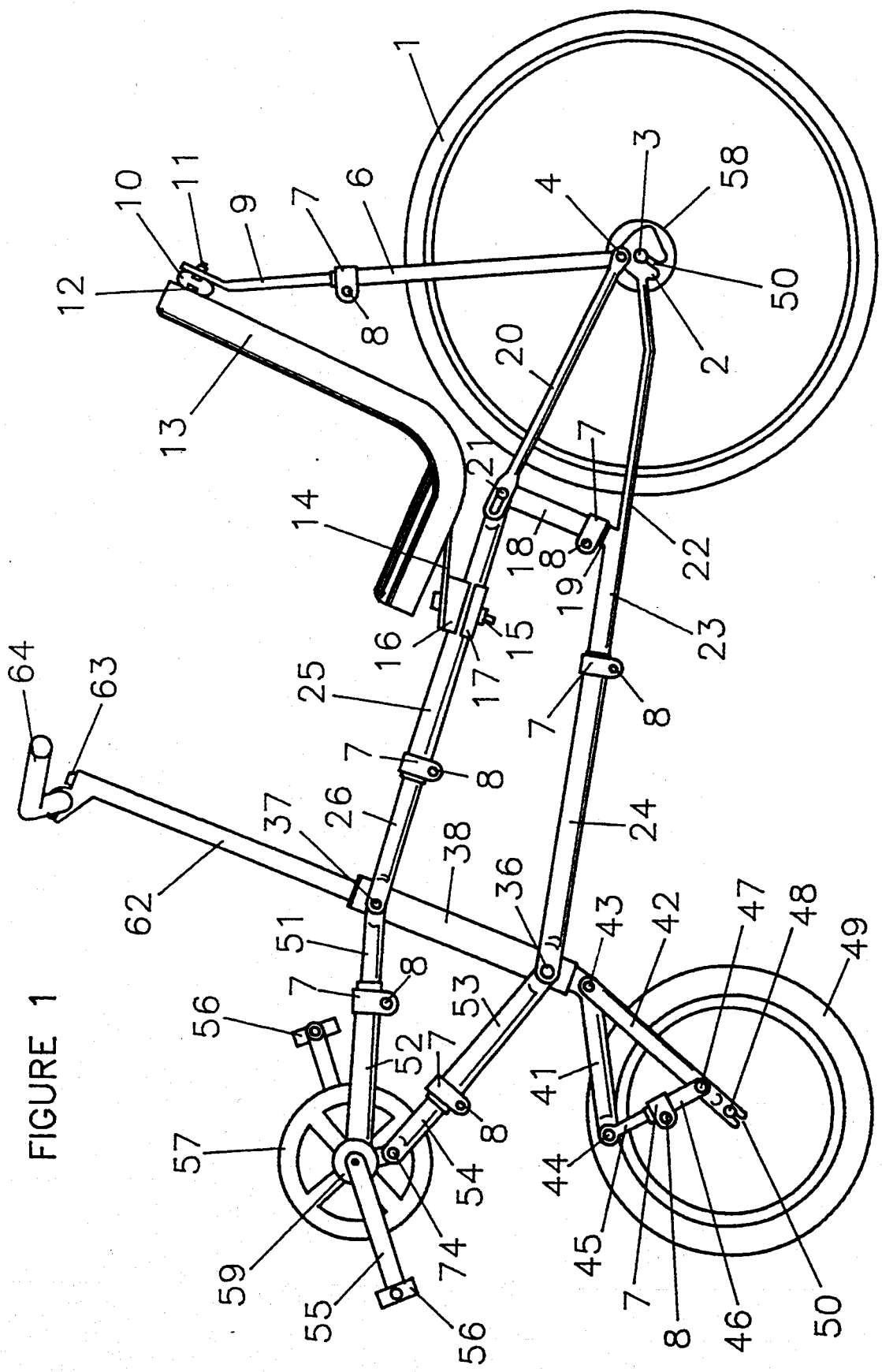
FIG. 1 is a left side view of one embodiment of the invention, showing adjustments made for a lower, more reclined rider's position.
Figure 2:
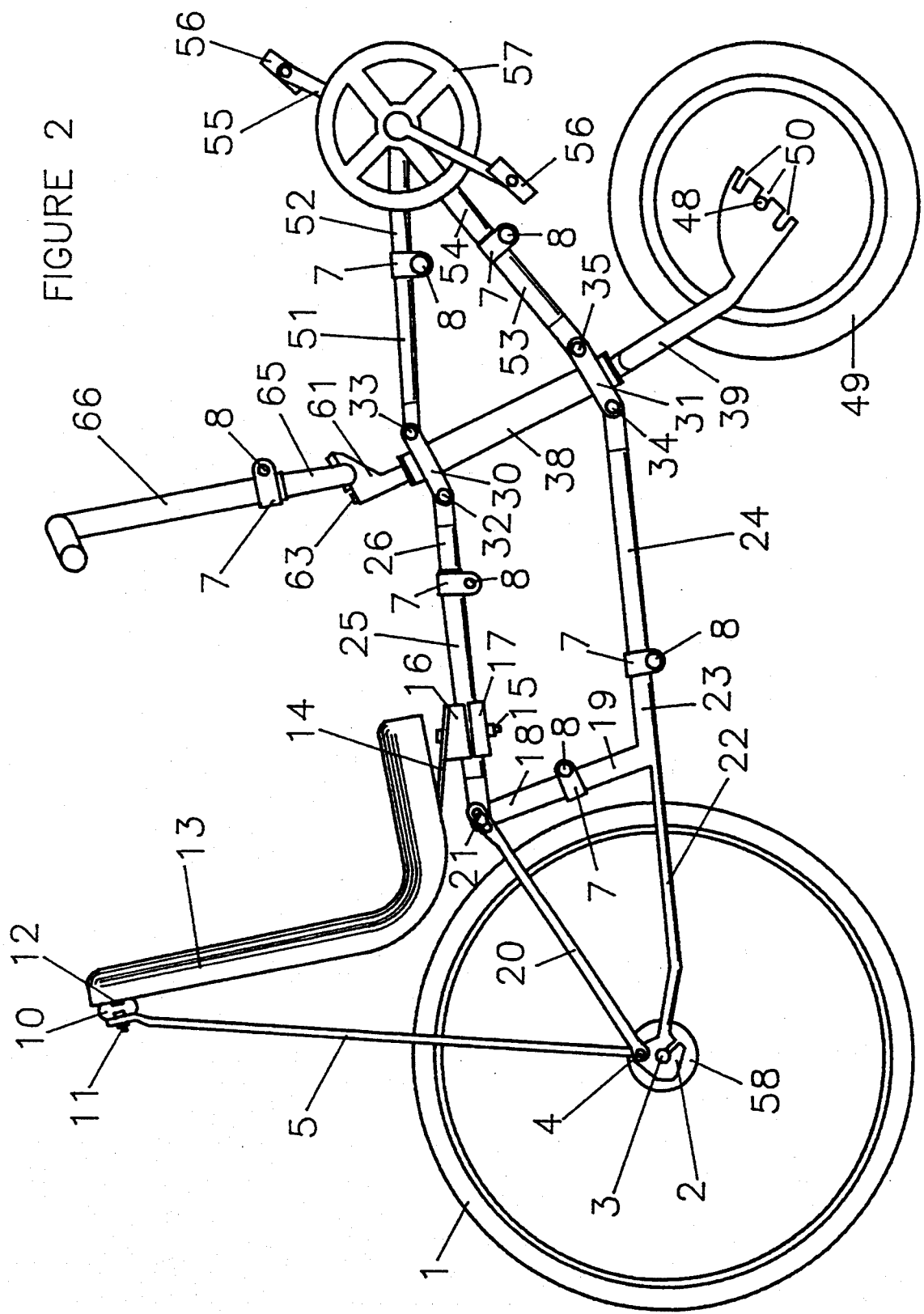
FIG. 2 is a right side view of a similar embodiment, showing the seat in a more upright, rearward position.

Referring now to FIG. 1, the numeral 1 depicts the rear wheel and 2 depicts the rear fork wheel brackets that hold each end of the rear axle 3. Rigidly attached to each rear fork wheel bracket is a lower rear wheel stay 22. The forward end of said lower rear wheel stay is rigidly attached to the back end of the rear section of lower reach bar 23, the bottom end of the bottom section of adjustable seat stay 19, and the second rear wheel stay 22. In FIG. 1 bottom section of rear wheel stay 19 is mostly hidden, as it is slid inside top section 18. In FIG. 2 more of bottom section 19 is visible, as seat stay 18-19 is more extended.

Upper rear wheel stays 20 are rotateably attached to their respective rear fork wheel brackets 2 with bolt 4 so that they are free to follow when the top section of adjustable seat stay 18 is slideably adjusted on the bottom section of the same seat stay, 19, previously described. This slideable adjustment allows the seat to be positioned at the height required. 7 depicts a typical clamping device and 8 depicts the clamp screw that clamp the bottom and top sections of seat stay 18-19 together. Adjustable seat stay 18-19 is typical of the tubular links, slideably connected, that allow for the unique adjustments of the present invention.

Front end of rear wheel stay 20, upper end of top seat stay 18 and rear end of upper reach bar 25 are all attached together by bolt 21. Upper rear wheel stays 20 are slotted at the joint of bolt 21 to allow for minor changes in length of stays 20 as adjustable seat stay 18-19 is lengthened and shortened.

It has been found that springing of the seat is very advisable on a recumbent bicycle, to prevent the spine jarring nature of large bumps, since the rider cannot stand up, and use his or her legs as shock absorbers as is the practice with standard diamond frame bikes. Seat 13, consisting of a base and a seat back is provided to support the rider. A simplified seat suspension system consists of seat bottom flat spring 14, and band spring 10. Flat spring 14 is rigidly attached to rear section of upper reach bar 25 with a clamping device consisting of top and bottom sections 16 and 17 which sandwich the upper frame reach bar with the aid of two pinch bolts 15. Flat spring 14 is rotateably attached to the underside of seat 13 on a transverse axis and flat band spring 10 is rigidly attached to both the top of the back of seat 13 and seat back stay 6-9. These springs both position the seat and suspend it, acting as linkages as well as springing devices.

It is important that seat bottom flat spring 14 be substantially parallel with a line from the center of pedal crank 55 to the base of seat 13. In this way the force of the rider's legs against pedals 56 is transferred thru it as a tensile force, in which direction it is very rigid, to the lower portion of the back of seat 13. If this spring is at too great an angle to the tensile force line, pedal pressure will cause unwanted vertical seat motion. The width of flat spring 14 (about two inches has been chosen in practice) also gives it rigidity against the twisting forces noted in the description of prior art. At the same time spring 14 is flexible on a vertical axis, so it allows the seat to move up and down as the bicycle traverses bumps in the roadway.

Band spring 10 is attached to the top of the back of seat 13 with bolt 12 and to the top section of adjustable seat back stay 9 with bolt 11. Band spring 10 (in practice 0.030" to 0.080" thick and 0.675" to 1.5" wide) counteracts a small portion of the rearward pressure of the pedal force against the seat back, but since its moment arm against this force, which is exerted against the base of the seat back, close to flat spring 14, is long, its main function is to support the seat and rider on the pitch axis and prevent unwanted lateral movement of the top of the seat back, against which forces flat spring 14 has little rigidity.

Seat 13 forms one side of an adjustable triangle whose front bottom apex is the transverse rotateable bearing at the back of seat base flat spring 14, whose rear bottom apex is bolt 4, and whose top apex is seat back band spring 10. The pitch or recline angle of the seat is set by adjusting the length of adjustable seat back stays 6–9.

The longitudinal position of the seat is set by sliding seat bottom spring clamp 15–17 along rear section of upper reach bar 25. The height of the seat is set by the aforementioned adjustment of adjustable seat post 18–19. Said adjustable triangular structure replaces and obviates the need for the customary rigid frame structure placed behind the seat as in Jarvis' and other common designs. Since the top end of seat stay 6–9 is free to move both vertically and horizontally. The present adjustable triangular geometry has the additional advantage of greater flexibility of adjustment over such a rigid frame. An additional advantage is that the seat can be placed closer to the back wheel, since there is no frame member between seat 13 and rear wheel 1.

The angle and position of the head tube or steering axis means 38 with respect to seat 13 and rear wheel 1 is set by means of adjustment of upper and lower reach bars 23–26. The upper reach bar consists of a front section 26 and a rear section 25, slideably attached by a clamp 7 and its pinch bolt 8. The lower reach bar consists of a front section 24 and a rear section 23, also slideably connected by a clamp 7 and pinch bolt 8. The front end of the front section of upper reach bar 26 is attached by a yoke and two bolts 37 (one on each side) to the upper end of head tube 38. Likewise the front end of the front section of lower reach bar 24 is attached by a yoke and two bolts 36 (one on each side) to the lower end of head tube 38.

Inserted in the top of head tube 38 is an elongated conventional gooseneck 62, attached by elongated conventional bolt 63. Attached to the top of gooseneck 62 are a pair of conventional low rise handlebars 64. Handlebars 64 allow the rider to control the direction of front wheel 49, and so to steer the bicycle.

The lead of front wheel 49 in front of the steering axis (as denoted by the line extensions to the ground in FIG. 1) is set by adjusting front fork 41–47. Said front fork consists of twin reach members 41 which are rigidly attached to the inner rotating tube of head tube 38, and are disposed either forward or behind the usual position of fork bars 42. Rotateably attached to the head tube end of fork reach bars 41 with bolts 43 are fork bars 42. Each fork bar 42 has at its lower extremity a slot 50 for the engagement of the front wheel axle 48. The forward leading angle of fork bars 42 is set by adjusting the length of front fork adjusting links 44–47, again one on each side of front wheel 49. Said links consists of a front section 45 and a rear section 46. One end of each front fork adjustment link is attached to the extremity of each fork reach bar 41 with a bolt 44 and the other end is attached near the extremity of fork bar 42 with a bolt 47. Adjustment link bars 45 and 46 are themselves slideably attached by the use of a clamp 7 and pinch bolt 8.

The rear section of an adjustable upper front extension 51, and the front section of the same adjustable front extension 52, provide adjustment for the leg length of the rider, once other parameters have been set. At its rearward extremity, rear section 51 is transversely rotateably attached to the top of the steering axis head tube 38. At its forward extremity, front section 52 is rigidly attached to the crank bearing bracket 59. The front section of lower front extension link 54 is rotateably attached to crank bearing bracket 59, with bolt 74 as the angles of the triangle formed by head tube 38, upper front extension 51–52 and lower front extension 53–54 change during adjustment of the front extension.

Crank bearing bracket 59 rotateably accepts pedal crank 55. Chain wheel(s) 57 and pedals 56 are mounted on crank 55 in the customary manner. Adjustment of lower front extension 53–54 sets the vertical position of the pedals. The normal setting for this parameter is such that the heels of the rider's feet just clear the front wheel when it is turned for steering. A conventional bicycle chain (not shown for simplicity) connects chain wheel(s) 57 and free wheel(s) 58 to transmit power from the pedals to the rear wheel in a conventional manner. It is understood that other foot operated power production means and other power transmission means known to the art could also be employed.

In the embodiment of FIG. 1 only one major frame joint is constrained rotateably. This is the joint between lower rear wheel stay 22, the rear section of lower reach bar 23, and the bottom section of seat stay 19. This joint is rotateably constrained because the chain power means would impinge on lower rear wheel stay 22 if it were rotated outside narrow limits. It is not necessary to articulate said joint in order to attain the necessary adjustability between components. While this joint could be articulated, a rigid joint at this point gives a reference around which other adjustments can be made.

Four differences between the embodiments of FIGS. 1 and 2 should be noted, besides the differences in frame adjustment for a higher, more erect rider position. Firstly, FIG. 1 depicts an extended gooseneck 62 topped by straight low rise handlebars 64. FIG. 2 depicts a short gooseneck 61 combined with hi rise adjustable handlebars 65–66. The hi rise bars are preferred because they provide greater vertical adjustment, and additionally they can be adjusted in a forward or rearward direction. Another advantage of the hi rise bars is that in the event of a crash, they can move, and do not provide a rigid point that can hurt the rider. In a production situation non-adjustable hi rise bars have advantages for safety and light weight.

The second difference between FIGS. 1 & 2 is the mechanism to adjust the amount of lead on the front wheel fork. FIG. 1 shows an infinitely adjustable mechanism 41–47, while FIG. 2 shows a simpler, lighter, though more crude incrementally adjustable fork 39 with multiple slots 50. Slots 50 engage axle 48 of front wheel 49 in a conventional manner. Both these mechanisms provide adjustable lead for the front wheel bearing in front of the head tube steering axis line. Thus, as head tube 38 is inclined more or less, the imaginary line extending down through the head tube steering axis means to the ground can be adjusted at or behind another imaginary line dropping vertically down from the front wheel axis (axle 48). As mentioned above this is necessary to maintain good rideability.

Thirdly, in the embodiment of FIG. 2 the seat back stay 5 is not adjustable in length. Fourthly, Attachment of resin bars 24 and 26 and front extensions 51 and 53 to head tube 38 are mediated by head tube attachment brackets 30 and 31 and bolts 32–35.

Figure 3:
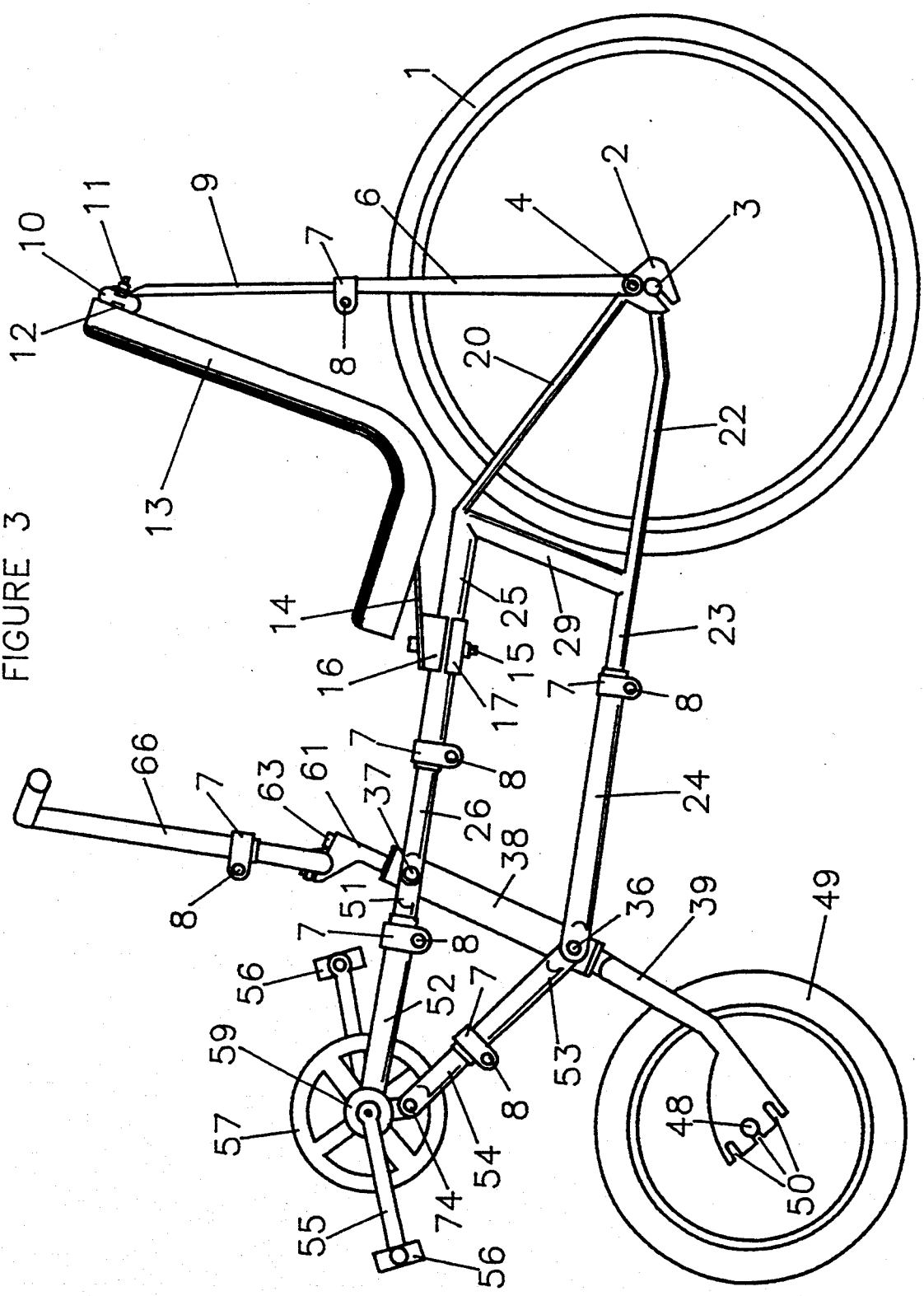
FIG. 3 shows an embodiment with non-adjustable seat stay and rigid joint between the top of the seat stay, the upper rear wheel stay, and the rear section of the upper reach bar.

The model depicted in FIG. 3 does not have vertical seat adjustment, as seat stay 29 is not adjustable. However it does allow for forward and rearward movement of the seat, and adjustment of the seat recline angle by means of the adjustable seat back stay 6–9. Making the joint between seat stay 29, upper rear wheel stay 20 and the rear section of upper reach bar 25 solid simplifies the frame, once this parameter is fixed. It might seem that there would be a problem in alignment as joints 36 and 37 are adjusted for different angles of head tube 38. In practice this has not been a problem as the frame members have sufficient flexibility to form themselves to the narrow changes in angle required.

Figure 4:
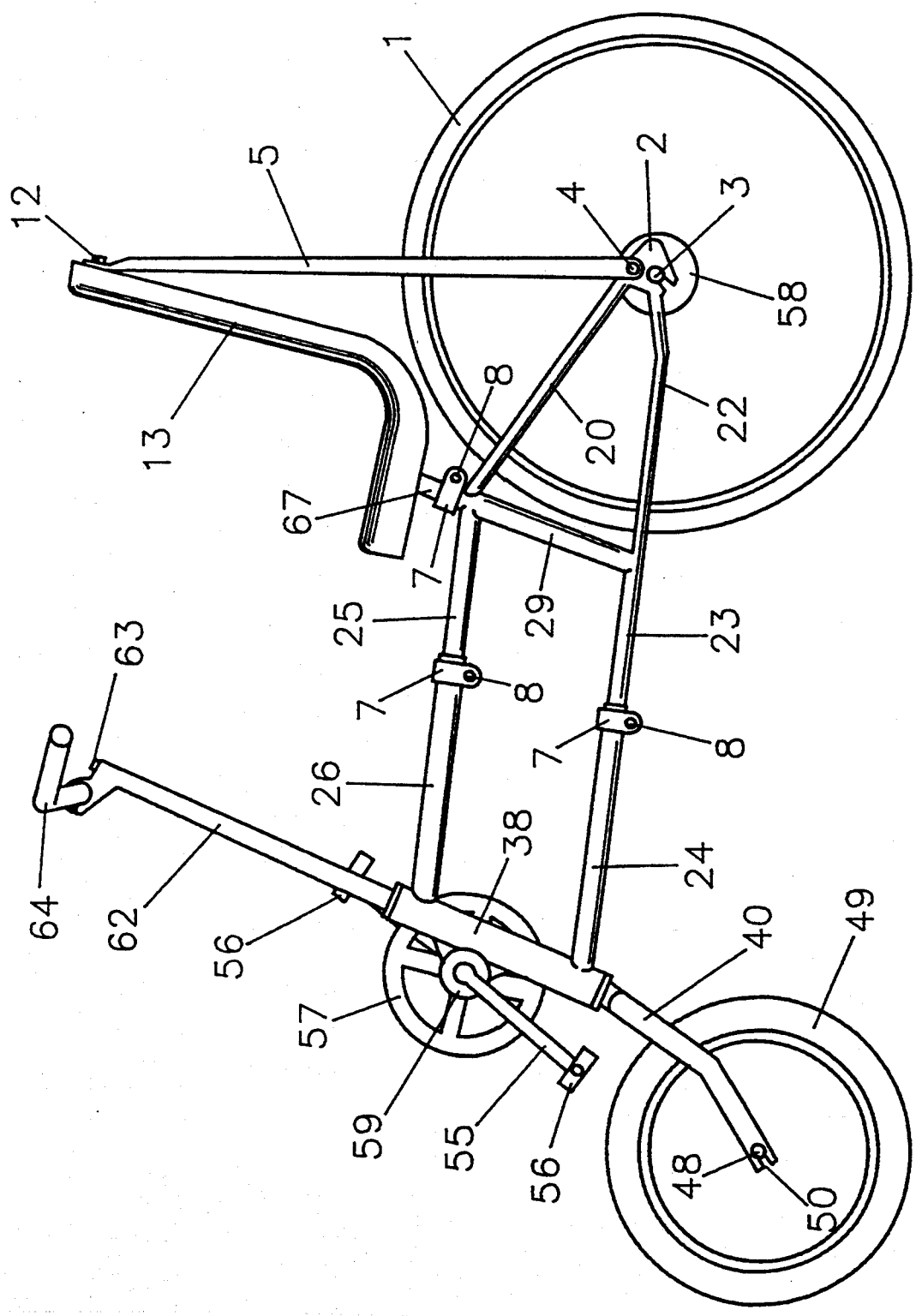
FIG. 4 shows an embodiment with the crank bearing bracket 59 rigidly attached to the head tube 38. The head tube is additionally rigidly attached to the front sections of the reach bars, so that head tube angle is not adjustable. In this drawing the seat is rigidly attached, rather than sprung.

In the embodiments of FIG. 4, the seat is rigidly attached by means of a conventional seat post 67. Non-adjustable seat back stay 5 is attached directly to the back of seat 13 with bolt 12. The design of FIG. 4 is also fitted with a non-adjustable front fork 40. While the design of FIG. 4 is not the preferred embodiment for street use, it is simple, and lighter in weight, which in some applications such as racing is an advantage.

Figure 5:
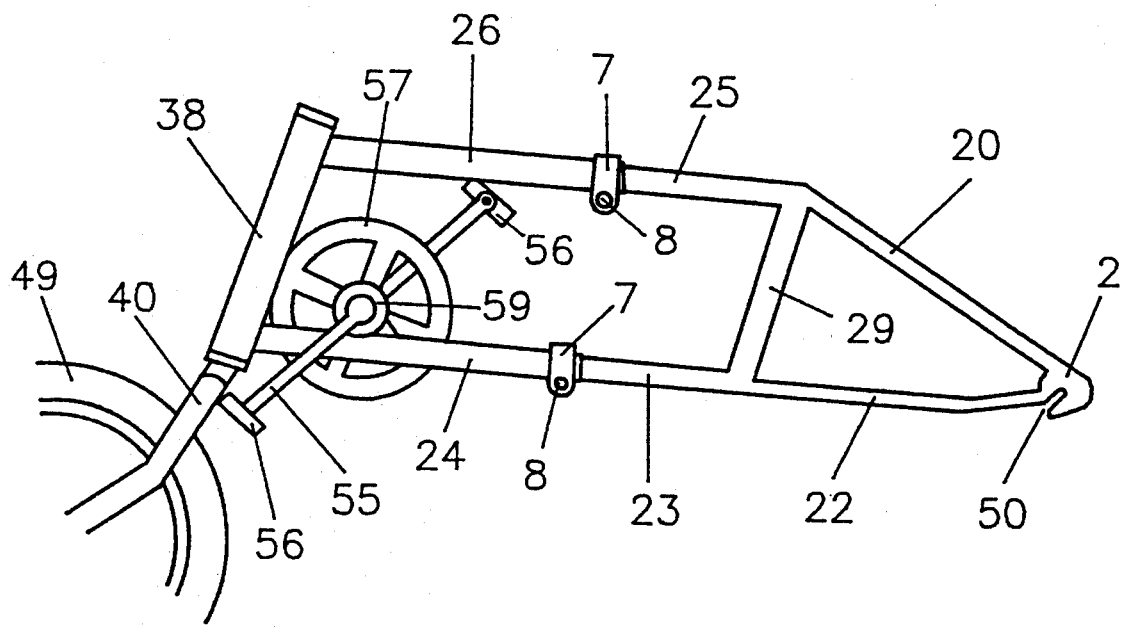
FIG. 5 depicts a long wheelbase type frame with the pedal crank assembly attached to the front section of the lower reach bar.
Figure 8:
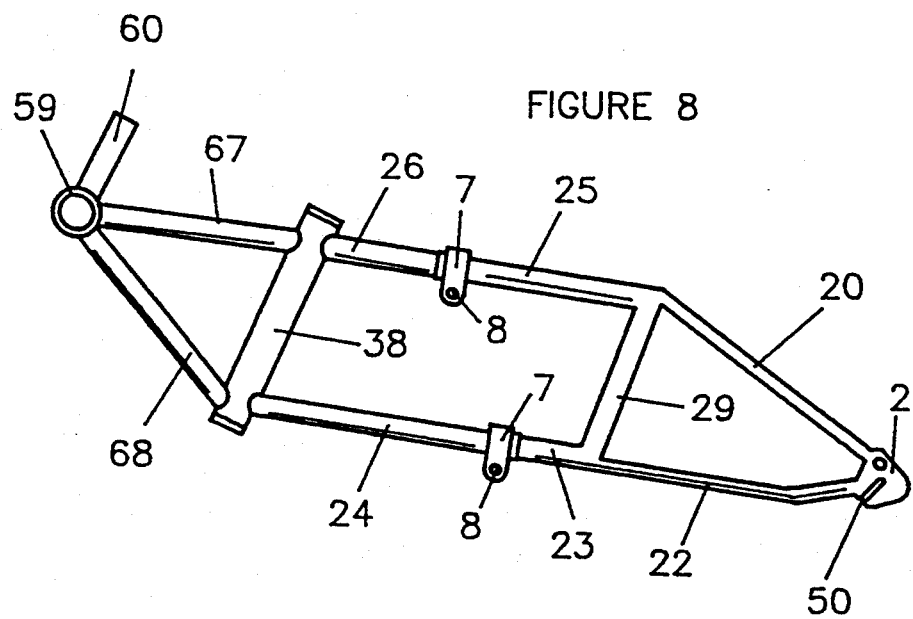
FIG. 8 shows a frame with only the reach bars adjustable. While not the preferred configuration, because pedal position cannot be adjusted while holding constant the geometry of the rider-wheel combination, it is a simple rigid frame.

FIGS. 4, 5, and 8, depict a further simplification of the adjustable recumbent bicycle frame. In these depictions only the reach bars 25-26 and 28-29 are adjustable. The angle of head tube 38 is not adjustable. FIG. 8 also embodies an optional frame extension 60 for the mounting of a front derailleur. No special parts on the frame are necessary to mount standard rear derailleurs. Each of these figures shows a different position for the crank bracket 59. FIG. 8 shows a short wheelbase frame with rigid front extensions 67 and 68 to hold crank bracket 59. FIG. 4 shows an intermediate wheelbase frame with crank bracket 59 directly attached to head tube 38. FIG. 5 shows a long wheelbase frame with crank bracket 59 directly attached to front lower reach bar 24. The long wheelbase embodiment of FIG. 5 provides for adjustment between front and rear sections, allowing fitting to various sizes of rider with one frame, an improvement on present long wheelbase recumbents. While these are less preferred embodiments in terms of rideability, they are simple designs to manufacture. They also demonstrate that the adjustable frame described herein is applicable to all feet forward recumbent configurations.

Figure 6:
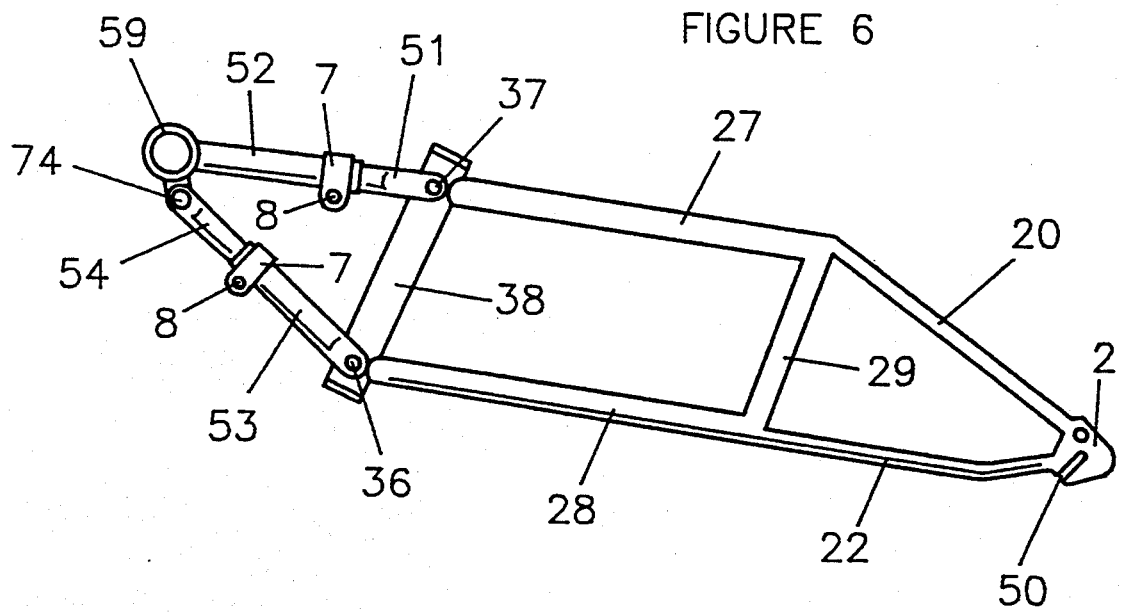
FIG. 6 shows a simplified frame version in which only the pedal crank assembly extension is adjustable.
Figure 7:
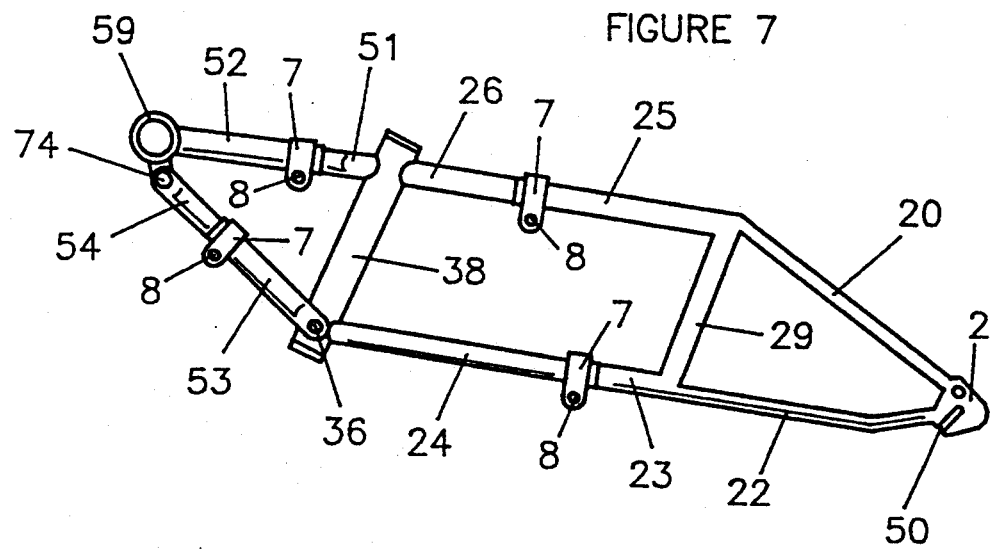
FIG. 7 shows a simplified frame version in which only the wheelbase and pedal crank assembly extension are adjustable. In this embodiment the rear section of the adjustable front extension is rigidly attached to the head tube, constraining crank bearing bracket 59 vertically.

FIG. 6 shows an embodiment in which the only adjustable aspect is front extensions 51-54. FIG. 7 shows a different front extension configuration in which the rear section of upper front extension 51 is rigidly attached to head tube 38. Where the front wheel size, the pedal crank length and size of rider's feet can be known or estimated, this is a simplification that is highly realistic.

Figure 9:
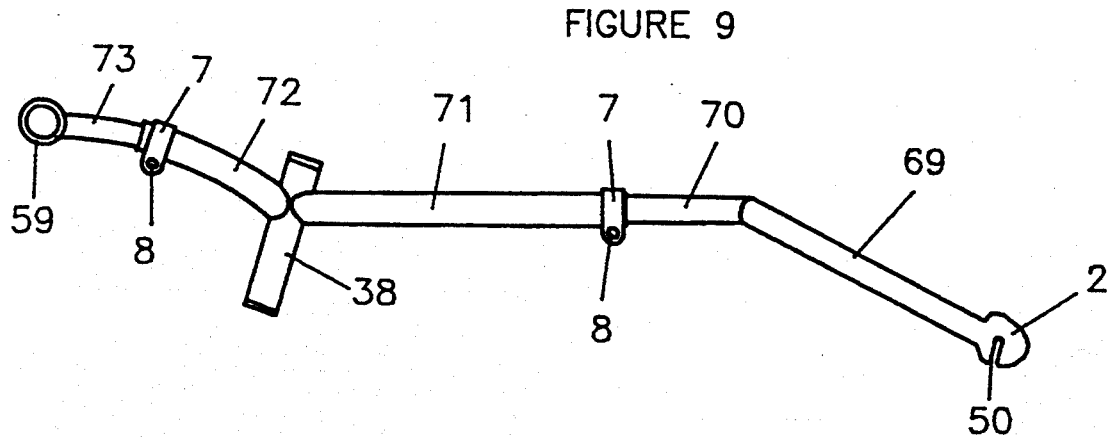
FIG. 9 shows a simplified monotube frame.

FIG. 9 shows a monotube frame. It consists of a single set of rear wheel stays 69 that are rigidly attached to the back end of rear section 70 of a single adjustable reach bar 70-71, slideably attached by the usual clamp 7 and pinch bolt 8. Front section 71 is in this depiction rigidly attached to head tube steering axis means 38. The front extension of FIG. 9, 72-73 is curvilinearly shaped to better conform to the clearance necessary for the pedal crank assembly and rider's feet over the front wheel. The cross section of the tubing of this frame is typically either keyed or configured in a shape other than round, eg. oval, tear drop, rectangular, diamond, square, etc, so that when it slideably extends or contracts, the elements are rotateably constrained as in prior art. In the multiple tube frames this is not necessary because the geometry of the frame precludes rotation. Frame members that are wider in cross section than they are high may become advisable for very strong riders even on the multiple tube models. Such members can potentially provide greater modulus against the torsional forces placed on the frame by pressure on the pedals 56, as these forces are transferred to the back of seat 13. Seat 13 is not shown in FIG. 9 for simplicity. The front extension of FIG. 9, 72-73 is curvilinearly shaped to better conform to the clearance necessary for the pedal crank assembly over the front wheel.

It should be understood that different aspects of the embodiments of the several drawings can be combined in different combinations. For instance, the curvilinear front extension of FIG. 9 could be utilized as a part of the double front extension of FIG. 7. The front extension of FIG. 7 could be combined with the non-adjustable reach bars of FIG. 6, etc.

Bicycles with all the above adjustments available in FIG. 1 tend to be heavy. They are valuable for testing, engineering, and fitting purposes, to develop simpler designs that possess all the good riding characteristics mentioned earlier. The simpler designs, with less adjustments available, are more appropriate for production in large numbers. Lighter weight rigid frame bicycles, fitted to an individual rider or a class of rider's style, use, and size, engineered by first determining their configuration thru experimentation with the adjustable frame bicycle are another marketable item. It is for this reason that I make claims as follows:

I claim:

1. A recumbent bicycle being arranged to be ridden in a feet forward position, comprising:
    a seat stay, said seat stay having a top and a base;
    a pair of spaced apart rear wheel stays extending in a rearward direction from said seat stay, said rear wheel stays having rear ends,
    rear axle-receiving slots located near the rear ends of said rear wheel stays,
    a rear wheel having a rear axle mounted in said rear axle receiving slots,
    a substantially horizontal tubular reach bar element having a front end and a rear end, extending forward from said seat stay,
    a seat mounted in a region of said rear end of said tubular reach bar element, said seat including a seat bottom and a seat back,
    a pair of seat back stays, each extending upwardly from a point near one of said rear axle receiving slots to an upper region of said seat back,
    a head tube connected to said front end of said tubular reach bar element, said head tube having a top and a bottom,
    a front fork, said front fork being rotatably supported by said head tube for turning movement about a turning axis,
    a front wheel having a front axle mounted on said front fork, substantially under said head tube,
    a hand operated steering means connected to said fork substantially above said head tube,
    an adjustable tubular front extension element extending forward from said head tube, comprising an upper tubular front extension member, a lower tubular front extension member, and a foot operated power production means comprising a base and moveable foot operated parts,
    said upper tubular front extension member comprising telescopically adjustably attached forward and rearward portions, said rearward portion of said upper tubular front extension member having a rearward end rigidly attached near said top of said head tube, and said forward portion of said upper tubular front extension member having a forward end rigidly attached near said base of said foot operated power production means,
    said lower tubular front extension member comprising telescopically adjustably attached forward and rearward portions, said rearward portion of said lower tubular front extension member having a rearward end pivotally attached on a transverse axis near said bottom of said head tube, and said forward portion of said lower tubular front extension member having a forward end pivotally attached on a transverse axis near said base of said foot operated power production means, said adjustable tubular front extension element providing adjustability between said foot operated power production means and a combination of said seat and said rear wheel, substantially along a vertical longitudinal plane of said bicycle.

2. The bicycle of claim 1 wherein said front fork includes means for adjusting a lead dimension between said front axle and said turning axis of said head tube.

3. The bicycle of claim 1 in which said seat back stays are telescoping members.

4. The bicycle of claim 1 wherein said upper tubular front extension member is additionally pivotally attached to said head tube, providing vertical adjustment of said foot operated power production means.

5. The bicycle of claim 1 in which said tubular reach bar element is telescopically adjustable.

6. The bicycle of claim 1 wherein said tubular reach bar element comprises two vertically spaced apart reach bar members.

7. The bicycle of claim 6 in which said spaced apart reach bar members comprise telescopically adjustable forward and rearward portions.

8. The bicycle of claim 7 in which said reach bar members have front ends which are pivotally attached near said head tube on transverse axes providing lead angle adjustability of said turning axis.

9. The bicycle of claim 6 wherein said bicycle has upper and lower pairs of said rear wheel stays,
said upper pair of rear wheel stays extending at a downward angle in a rearward direction from said top of said seat stay,
said lower pair of rear wheel stays extending substantially horizontally in a rearward direction from said base of said seat stay,
each of said upper rear wheel stays having a rearward end which is connected to said respective lower rear wheel stay near its rearward end.

10. The bicycle of claim 9 wherein said seat stay comprises upper and lower telescoping members,
said lower telescoping member of said seat stay being attached near its lower end to a rearward end of said lower member of said reach bar element and to a forward end of said lower rear wheel stays,
said upper rear wheel stays being pivotally attached along a transverse axis at their rearward ends near said rearward end of said lower rear wheel stays, and pivotally attached at their forward ends along a transverse axis near an upper end of said upper telescoping member of said seat stay as well as the rearward end of said upper member of said reach bar element.

11. The bicycle of claim 1 wherein said seat is slideably adjustably attached to said reach bar element.

12. A recumbent bicycle being arranged to be ridden in a feet forward position, comprising:
a seat stay, said seat stay having a top and a base, a pair of spaced apart rear wheel stays extending in a rearward direction from said seat stay, said rear wheel stays having rear ends,
rear axle-receiving slots located near the rear ends of said rear wheel stays,
a rear wheel having a rear axle mounted in said rear axle receiving slots,
a substantially horizontal adjustable tubular reach bar element having a front end and a rear end, extending forward from said seat stay,
said tubular reach bar element comprising upper and lower vertically spaced apart tubular reach bar members,
said tubular reach bar members comprising telescopically adjustable forward and rearward portions,
a seat mounted in a region of said rear end of said tubular reach bar element, said seat including a seat bottom and a seat back,
a pair of seat back stays, each extending upwardly from a point near one of said rear axle receiving slots to an upper region of said seat back,
a head tube connected to said front end of said tubular reach bar element, said head tube having a top and a bottom,
a front fork, said front fork being rotatably supported by said head tube for turning movement about a turning axis,
a front wheel having a front axle mounted on said front fork, substantially under said head tube.
a hand operated steering means connected to said fork substantially above said head tube,
a foot operated power production means comprising a base and moveable foot operated parts,
said base of said foot operated power production means being mounted in a region of said front end of said tubular reach bar element,
said adjustable reach bar element providing adjustability between said foot operated power production means and a combination of said seat and said rear wheel, substantially along a vertical longitudinal plane of said bicycle.

13. The bicycle of claim 12 wherein said front fork includes means for adjusting a lead dimension between said front axle and said turning axis of said head tube.

14. The bicycle of claim 12 in which said seat back stays are telescoping members.

15. The bicycle of claim 12 in which said reach bar members have front ends which are pivotally attached near said head tube on transverse axes providing lead angle adjustability of said turning axis.

16. The bicycle of claim 12 wherein said bicycle has upper and lower pairs of said rear wheel stays,
said upper pair of rear wheel stays extending at a downward angle in a rearward direction from said top of said seat stay,
said lower pair of rear wheel stays extending substantially horizontally in a rearward direction from said base of said seat stay,
each of said upper rear wheel stays having a rearward end which is connected to said respective lower rear wheel stay near its rearward end.

17. The bicycle of claim 16 wherein said seat stay comprises upper and lower telescoping members,
said lower telescoping member of said seat stay being attached near its lower end to a rearward end of said lower tubular reach bar member and to a forward end of said lower rear wheel stays,
said upper rear wheel stays being pivotally attached along a transverse axis at their rearward ends near said rearward end of said lower rear wheel stays, and pivotally attached at their forward ends along a transverse axis near an upper end of said upper telescoping member of said seat stay as well as the rearward end of said upper tubular reach bar member.

18. The bicycle of claim 12 wherein said seat is slideably adjustably attached to said reach bar element.

19. In combination, a recumbent bicycle ridden in a feet forward position, including a frame, a foot operated power production means and a seat comprising a bottom and a back,
   said seat both located and sprung by a flat leaf spring and a flat band spring connecting said seat to said bicycle frame,
   said flat leaf spring being attached to said bottom of said seat,
   placed substantially parallel with a line from said foot operated power production means to said bottom of said seat,
   having an orientation which permits vertical deflection and prevents horizontal and yaw movement;
   said flat band spring being connected to an upper region of said seat back,
   having an orientation which permits vertical deflection, provides longitudinal firmness and substantial transverse rigidity;
   whereby said seat is both suspended and positioned against the forces of propulsion, and the weight of the rider.

* * * * *